United States Patent [19]

Merino

[11] Patent Number: 5,522,347
[45] Date of Patent: Jun. 4, 1996

[54] ENCLOSED VENTILATED LITTER BOX WITH A SELF-STORING TOP COVER

[76] Inventor: Alfonso Merino, 5800 Gondolier Dr., New Bern, N.C. 28560

[21] Appl. No.: 383,574

[22] Filed: Feb. 2, 1995

[51] Int. Cl.[6] .................................................. A01K 1/035
[52] U.S. Cl. ........................................................ 119/165
[58] Field of Search ............................ 119/165, 168, 119/166, 167, 169, 170, 161; 220/213, 252, 908

[56] References Cited

U.S. PATENT DOCUMENTS

| | | |
|---|---|---|
| D. 286,694 | 11/1986 | O'Rourke . |
| D. 300,965 | 5/1989 | Conner . |
| D. 300,966 | 5/1989 | Conner . |
| D. 300,967 | 5/1989 | Conner . |
| D. 300,968 | 5/1989 | Conner . |
| D. 319,117 | 8/1991 | Goetz . |
| 2,736,452 | 2/1956 | Roop ................................ 220/252 |
| 4,029,048 | 6/1977 | Gershbein . |
| 4,111,157 | 9/1978 | Haugen . |
| 4,161,157 | 7/1979 | Haugen . |
| 4,303,172 | 12/1981 | Bosland ............................ 220/252 |
| 4,534,315 | 8/1985 | Sweeney . |
| 4,628,697 | 12/1986 | Bruck et al. ...................... 220/252 |
| 4,766,845 | 8/1988 | Bavas . |
| 4,934,317 | 6/1990 | Pourshalchi . |
| 5,042,430 | 8/1991 | Casmira . |
| 5,134,973 | 8/1992 | Sarullo . |
| 5,195,464 | 3/1993 | Mutter . |
| 5,211,133 | 5/1993 | Foley . |
| 5,211,134 | 5/1993 | Bolo, III ......................... 119/168 |
| 5,218,930 | 6/1993 | Casmira . |
| 5,220,885 | 6/1993 | Goetz . |
| 5,220,886 | 6/1993 | Hyde . |
| 5,360,132 | 11/1994 | Edelhoff ........................... 220/252 |

FOREIGN PATENT DOCUMENTS

| | | | |
|---|---|---|---|
| 2613693 | 10/1988 | France ............................ 119/168 |
| 595503 | 12/1947 | United Kingdom ............... 220/252 |

Primary Examiner—Todd E. Manahan
Attorney, Agent, or Firm—Hovey, Williams, Timmons & Collins

[57] ABSTRACT

A litter box apparatus for small animals includes an open box and a cover received over the box. The cover includes a hooded opening for permitting animal access to the box, and is supported on the box for pivotal movement about a horizontal axis between a use position in which the cover closes off the box except for the opening so that animals may enter and use the box, and a service position in which the cover exposes the box for servicing. The pivot axis is centrally located over the floor so that the cover rolls about the box between the use and service positions without requiring a substantial amount of additional floor space than that occupied by the box.

16 Claims, 2 Drawing Sheets

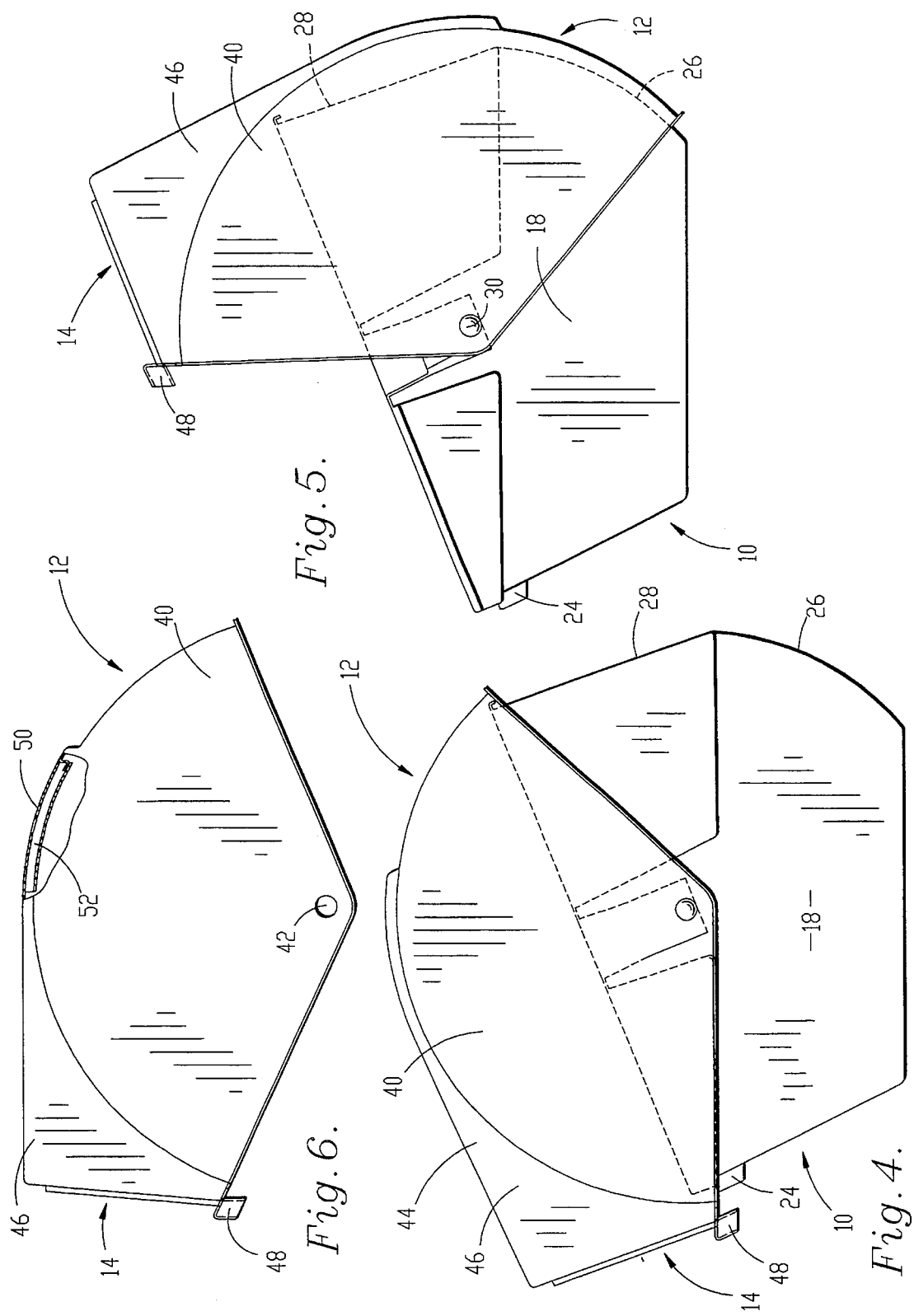

ENCLOSED VENTILATED LITTER BOX WITH A SELF-STORING TOP COVER

BACKGROUND OF THE INVENTION

1. Field of the Invention

The present invention relates generally to litter boxes for cats and other small domesticated animals and, more particularly, to an enclosed litter box that controls odor and contains litter.

2. Discussion of the Prior Art

It is known to provide a covered litter box having a cover received over an open box for trapping air and containing litter. This conventional apparatus includes a hooded opening defined between the cover and box for permitting animal access to the box in use. The cover is typically a separate piece from the box, and must be lifted from the box in order to change the litter or service the box in any way.

An alternate conventional construction of a covered litter box apparatus includes a cover that is connected to the box by a hinge running along the rear edges of the box and cover so that the cover may be pivoted away from the box during servicing.

Numerous problems arise in the use of these conventional constructions. For example, both known constructions require that the cover be removed from over the box and positioned to the side of it when the box is serviced. Thus, twice the space occupied by the box must be available to permit servicing, however, litter boxes are commonly used in out-of-the-way rooms where only limited floor space is available.

Another disadvantage with conventional litter box apparatuses is that such devices are difficult to service since the covers are typically fastened to the boxes at a plurality of locations. Thus, they are not easily opened for servicing, and require that the box be moved from the use position, or that the user bend down to the box, to remove the cover.

OBJECTS AND SUMMARY OF THE INVENTION

It is an object of the present invention to provide a covered litter box apparatus that uses up minimal floor space, even during servicing, and that is easy to open and close without requiring anything more than the flip of a toe.

It is another object of the present invention to provide a litter box apparatus that presents an air flow path for ventilating the box and discharging air through a filter to reduce odor.

Another object of the present invention is to provide a litter box apparatus having handles on both the box and cover for permitting easy lifting and carriage of the apparatus in either the storage or use positions. In addition, the cover and box of the apparatus are designed so that the cover can be easily removed from the box and inverted, and the box then nested in the cover for storage of the apparatus. Likewise, several covers or several boxes may be stacked on top of one another in a nesting relationship for efficient storage of the parts after manufacture of the parts is completed.

In accordance with these and other objects evident from the following description of a preferred embodiment, a litter box apparatus includes an open box and a cover. The open box is defined by a generally horizontally extending bottom wall and at least one upstanding side wall extending around the bottom wall, and the cover is received over the box and includes a hooded opening for permitting animal access to the box. A mounting means is provided for mounting the cover on the box for pivotal movement about a horizontal axis between a use position in which the cover closes off the box except for the opening so that animals may enter and use the box, and a service position in which the cover exposes the box for servicing. The axis is centrally located over the floor so that the cover rolls about the box between the use and service positions without requiring a substantial amount of additional floor space than that occupied by the box.

Several advantages are obtained from this construction. For example, by providing a cover supported on the box for pivotal movement about a centrally located axis, the cover rolls about the box without extending laterally beyond the box by more than a minimal distance. As a result, the box may be positioned in a very tight space, and can be serviced in this space without the need for removing the box or cover for service.

BRIEF DESCRIPTION OF THE DRAWING FIGURES

The preferred embodiment is described in detail below with reference to the attached drawing figures, wherein:

FIG. 4 is a side elevational view of the litter box, illustrating the cover in the use position;

FIG. 5 is a side elevational view of the litter box, illustrating the cover in the service position; and FIG. 6 is a side elevational view of the cover, partially in section.

DETAILED DESCRIPTION OF THE PREFERRED EMBODIMENT

Figure 1:
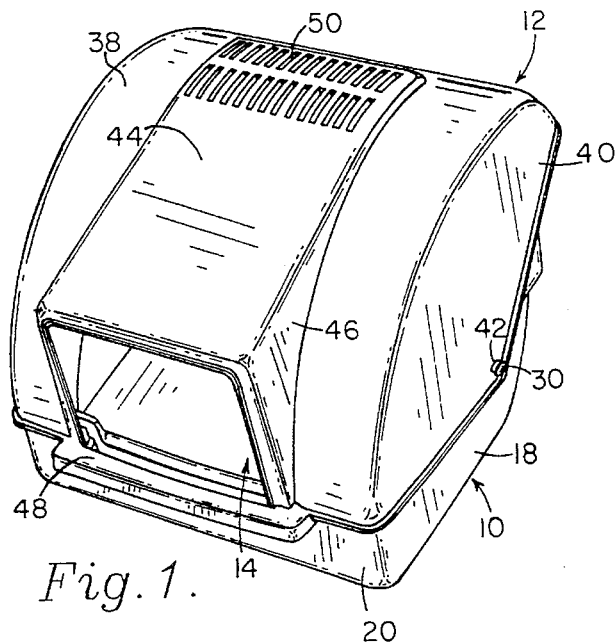
FIG. 1 is a perspective view of the litter box, illustrating a cover of the apparatus in a use position.

A covered litter box constructed in accordance with the preferred embodiment is illustrated in FIG. 1, and broadly includes an open box 10 and a cover 12. In FIG. 1, the cover is illustrated in a use position enclosing the box except for a hooded opening 14 provided in the cover. The apparatus is illustrated in a service position in FIG. 2, wherein the cover is pivoted about the box to a position exposing the interior of the box for cleaning.

Figure 2:
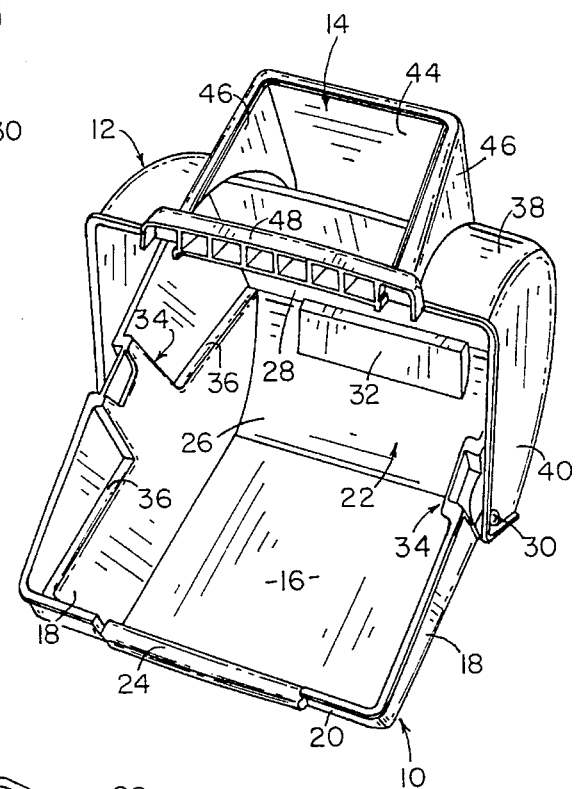
FIG. 2 is a perspective view of the litter box, illustrating the cover in a service position.
Figure 3:
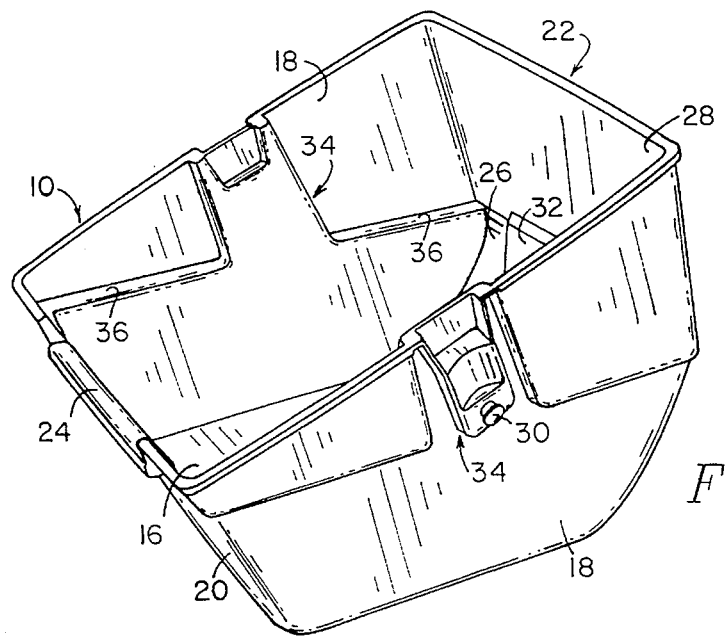
FIG. 3 is a perspective view of an open box of the apparatus.

As shown in FIG. 2, the box is defined by a generally horizontally extending bottom wall 16, a pair of opposed upstanding side walls 18, and opposed upstanding front and rear walls 20, 22. As shown in FIG. 3, the front wall 20 is angled slightly forward from vertical and includes a central lip 24 along its upper edge for facilitating access to the box by a small animal.

The rear wall 22 is taller than the front wall and includes a lower cylindrical region 26 and an upper planer region 28. The lower cylindrical region is radiused about a horizontal axis defined by a pair of pivot pins 30 formed in the side walls 18 so that the region is curved upward and outward from the bottom wall 16 to a height substantially equal to the lip 24 of the front wall. The upper planer region 28 of the rear wall is angled forward from vertical within a plane substantially parallel to the front wall so that the upper region partially encloses the box and forms an extended barrier against animal urine spray and scratched up litter.

A recess 32 is formed in the rear wall between the lower cylindrical region and the upper planer region, and defines a handle that is substantially level with the lip 24 on the front wall. The handle 32 and lip 24 together define a means for lifting the apparatus.

The side walls 18 are generally vertical, and connect the front and rear walls together to complete the open box construction. Each side wall includes a sloping upper edge, and a hub 34 extending downward from the edge at a position centrally located on the wall. Each hub includes one of the pivot pins 30, and is of a thickness greater than the thickness of the surrounding wall in order to withstand loading by the cover. Each pin 30 includes a distal end formed with a head having a diameter larger than the remainder of the pin so that the head retains the cover on the pin once assembled.

Each side wall also includes interior shelves 36 extending between the hub and the front and rear walls. These shelves define lips on the outside surface of each side wall which enhances rigidity of the box.

Preferably, the box 10 is molded of a synthetic resin as a single part, and permits nesting receipt of another box within it to facilitate stockpiling of the boxes after manufacture. The cover 12 is also molded of a synthetic resin preferably as a single part, and permits nesting receipt of additional covers.

As shown in FIG. 1, the cover 12 broadly includes a cylindrical top wall 38, a pair of opposed, pie-shaped side walls 40 depending from the top wall, and the hooded opening 14 which protrudes forward and outward from the top wall.

The side walls 40 are spaced from one another by a distance greater than the spacing between the side walls 18 of the box 10 so that the cover may be received over the box. This also permits the use of a thin flexible plastic liner within the bottom box 10 which facilitates cleaning of the box and disposal of soiled litter. Each side wall 40 is vertical, and includes a hole 42 formed near the lowermost apex defined by the wall. The holes 42 are sized for snap-fit receipt on the pins 30 and support the cover for pivotal movement about the horizontal axis defined by the pins.

The top wall 38 is radiused about the horizontal axis so that the cover is curved from front to back. The radius of the top wall is slightly greater than the radius of the lower cylindrical region 26 of the rear wall so that the cover may be pivoted from the use position, as shown in FIG. 4, to the service position shown in FIG. 5, by rotating down over the rear wall.

Returning to FIG. 1, the hooded opening 14 includes a generally rectangular upper wall 44, a pair of opposed, vertical side walls 46 connecting the upper wall to the top wall of the cover, and a handle 48 formed between the vertical side walls at the bottom of the opening. The opening is angled upward and forward of the box between the handle 48 and the upper wall 44.

As illustratd in FIG. 4, the upper wall 44 is sloped upward away from the opening and extends approximately two-thirds the length of the top wall. A vent 50, shown in FIG. 1, is formed in the rearmost region of the upper wall, and is situated at the uppermost point of the cover when the cover is in the use position. Thus, the upper wall guides air entering the opening and within the box upward toward the vent so that it can be discharged.

As shown in FIG. 6, a chamber 52 is formed in the cover immediately beneath the vent, and is adapted to receive a filter for filtering air being discharged from the apparatus. Although the filter is not shown, any conventional filtering material may be used simply by inserting the material into the chamber against the vent. It is possible to access the chamber and to replace the filter when the cover is in the service position.

The handle 48 extending across the bottom of the opening provides a means for moving the cover back and forth between the use and service positions. The handle may be gripped to lift the apparatus as well.

During use, the cover 12 is pivoted to the service position and clean litter is deposited in the open box. The cover remains in the service position without assistance due to the bulk of the weight of the cover being disposed to the rear of the pivot axis. Once the box has been prepared, the cover is rolled to the use position simply by pivoting the cover about the axis. As the cover is pivoted, the weight of the cover moves over the axis so that gravity then biases the cover toward the use position, and no additional fasteners are required to hold the cover in place. Thus, the cover is counterbalanced to rest in both the use and service positions once moved.

In the use position, the cover permits access to the box through the hooded opening so that small animals are able to enter and leave the apparatus without difficulty. Any odor from the waste in the box is filtered as air enters the box through the opening and is discharged through the filter and vent.

It will be appreciated by those skilled in the art that a top portion including cover 12 could be provided which, along with a bottom portion comprising the bottom wall 16, the side walls 18 and the front and back walls 20, 22, defines a hollow enclosure. The cover 12 and the bottom portion progressively mutually overlap as the cover 12 is retracted into an access position where the interior of the box is exposed for cleaning.

Although the present invention has been described with reference to the preferred embodiment illustrated in the attached drawing figures, it is noted that substitutions may be made and equivalents employed herein without departing from the scope of the invention as recited in the claims.

What is claimed is:

1. A litter box apparatus comprising:

an open box presenting front and rear ends and including a bottom wall and an upstanding side wall extending around the bottom wall;

a cover received over at least a portion of the box and including an opening for permitting animal access to the box at the front end;

a mounting means for mounting the cover on the box for pivotal movement about a horizontal axis between a use position in which the cover substantially closes off the box except for the opening at the front end so that animals may enter and use the box, and a service position in which the cover exposes the box for servicing, the horizontal axis being located substantially halfway between the front and rear ends of the box; and a vent means for venting air from within the box, the opening being formed in the cover at a height that is below the vent means in the use position of the cover so that air currents through the litter box follow a path into the opening and out through the vent means.

2. A litter box apparatus as recited in claim 1, wherein the box is generally rectangular, including a rear wall along the rear end, a front wall along the front end, and a pair of opposed side walls extending between and connecting the front and rear walls, the horizontal axis extending in a direction transverse to the side walls so that the cover is supported on the side walls.

3. A litter box apparatus as recited in claim 2, wherein the rear wall includes an arcuate section radiused about the horizontal axis, and the cover includes an arcuate top wall radiused about the horizontal axis and having a radius different than the radius of the arcuate section of the rear wall so that the cover is spaced from the rear wall when moved between the use and service positions.

4. A litter box apparatus as recited in claim 2, wherein the horizontal axis is defined by a pair of pivot pins formed in the side walls of the box and by a pair of openings formed in the cover for receipt of the pins.

5. A litter box apparatus as recited in claim 1, wherein the box includes a pair of handles for permitting lifting and moving of the box.

6. A litter box apparatus as recited in claim 1, wherein the vent means is formed in the cover.

7. A litter box apparatus as recited in claim 1, further comprising a filter support means for supporting a filter against the vent means to filter vented air.

8. A litter box apparatus as recited in claim 1, wherein the cover includes a handle for permitting the cover to be pivoted between the use and service positions and for permitting lifting and moving of the box.

9. A litter box apparatus as recited in claim 1, wherein the cover is biased by gravity into the use and service positions once the cover is pivoted to those positions.

10. A litter box apparatus as recited in claim 1, wherein the cover completely surrounds the opening, and includes a handle provided beneath the entrance when the cover is in the use position.

11. A litter box apparatus as recited in claim 1, wherein the opening in the cover extends outward and upward from the front end of the box when the cover is in the use position so that air is directed upward into the opening.

12. A litter box apparatus as recited in claim 1, wherein the cover includes an upper wall that is sloped upward away from the opening toward the vent means for directing air in the apparatus from the opening toward the vent means.

13. A space-saving litter box comprising:

a bottom portion; and a top portion cooperating with the bottom portion to define a hollow enclosure having an interior space, said enclosure having a vent positioned at a height that is above the opening so that air currents through the litter box follow a path into the opening and out through the vent, said top portion including a retractable cover pivotable into and out of an access position exposing said interior space for service, said cover defining an opening to permit the entry and exit of an animal into and out of said interior space, said top and bottom portions being so configured, and said cover being so mounted, that said cover and said bottom portion progressively mutually overlap as the cover is retracted to said access position.

14. A space-saving litter box as claimed in claim 13, said cover being mounted on the bottom portion.

15. A space-saving litter box as claimed in claim 14, said cover having structure pivotally mounting the cover on said bottom portion for swinging movement of the cover toward and away from said access position.

16. A space-saving litter box as claimed in claim 15, said cover being disposed to overlap the exterior of said bottom portion as the cover is swung toward said access position.

* * * * *